United States Patent [19]

Solomon

[11] 3,725,326
[45] Apr. 3, 1973

[54] EPDM RUBBER TIRE CORD ADHESIVE FROM DICYCLOPENTADIENE LATEX AND RESORCINOL-ALDEHYDE RESIN

[75] Inventor: Thomas S. Solomon, Brecksville, Ohio

[73] Assignee: The B. F. Goodrich Company, New York, N.Y.

[22] Filed: Jan. 30, 1969

[21] Appl. No.: 795,337

Related U.S. Application Data

[63] Continuation-in-part of Ser. No. 491,400, Sept. 29, 1965, abandoned.

[52] U.S. Cl............260/29.3, 117/138.8 N, 117/145, 156/334, 260/29.7 T, 260/80.7, 260/846
[51] Int. Cl..........................C08f 5/00, C08f 41/10
[58] Field of Search..........................260/29.3, 29.7 T

[56] References Cited

UNITED STATES PATENTS

| 3,262,482 | 7/1966 | Clifton | 260/29.3 |
| 3,287,440 | 11/1966 | Giller | 260/848 |
| 3,299,170 | 1/1967 | Gonzenbach | 260/848 |
| 3,331,804 | 7/1967 | Fogiel | 260/848 |
| 3,338,769 | 8/1967 | Kühlkamp et al. | 260/29.3 |
| 3,364,155 | 1/1968 | Souffie | 260/897 |
| 3,437,122 | 4/1969 | Van Gils | 260/29.3 |
| 3,437,610 | 4/1969 | Moult | 260/848 |
| 3,311,151 | 3/1967 | Willis et al. | 260/29.7 |
| 3,379,666 | 4/1968 | Becker | 260/29.7 |
| 3,476,642 | 11/1969 | Berg et al. | 260/29.3 |

FOREIGN PATENTS OR APPLICATIONS

| 863,373 | 3/1961 | Great Britain | 260/88.2 |

Primary Examiner—Donald J. Arnold
Assistant Examiner—Arthur H. Koeckert
Attorney—Albert C. Doxsey

[57] ABSTRACT

A copolymer of dicyclopentadiene and a lower alkyl alpha-olefin, dispersed in water and combined with a water dispersion of resorcinol - formaldehyde resin is useful as a dip adhesive for rayon or nylon tire cord to adhere said cord to an EPDM carcass stock.

2 Claims, No Drawings

EPDM RUBBER TIRE CORD ADHESIVE FROM DICYCLOPENTADIENE LATEX AND RESORCINOL-ALDEHYDE RESIN

CROSS REFERENCES TO RELATED APPLICATIONS

This application is a continuation-in-part of earlier filed U.S. Pat. application of Thomas S. Solomon, Ser. No. 491,400 filed Sept. 29, 1965 now abandoned.

BACKGROUND OF THE INVENTION

Any synthetic elastomer is of interest to the manufacture of molded, extruded and cast articles made traditionally from natural rubber or any of the synthetic substitutes and alternative materials for natural rubber which have been developed in recent years. Elastomers currently receiving much attention, particularly because of their potential low cost and high resistance to weather, age, heat and ozone, are the terpolymers of ethylene and propylene with a straight chain or cyclic polyene material, generally a non-conjugated diene, the manufacture of which is disclosed in U.S. Pat. Nos. including 2,933,480 and 3,000,866. These ethylene-propylene-diene terpolymers are currently identified as EPDM rubbers in the ASTM description D1418-56T. The major difficulties with these materials in the eyes of the manufacturers are their lack of tack and lack of ability to adhere to other highly unsaturated polymers used in the preparation of many articles. These deficiencies of EPDM rubbers are caused by the low level of unsaturation that they have compared to natural rubber, which is basically a polymer of cis-polyisoprene.

To become a major item in the present day synthetic rubber industry, a material must lend itself to the manufacture of shaped, textile reinforced articles such as tubing, belts, and the major product, tires. If a new material is low enough in cost and has sufficiently outstanding properties, the industry will make every effort to use it in spite of deficiencies that may make it more difficult to employ initially than the favorite natural rubber. Other synthetic materials, including styrene-butadiene rubber (SBR), and butyl rubber (IIR) have presented these and similar problems. The SBR and IIR materials lack the green strength and tack of natural rubber and have low adhesion to other materials such as rayon, nylon (polyamides) and Dacron (polyterephthalates), textiles which are currently used for tire cord and reinforcing plies in hose and belts. Tires and other shaped articles have been made from these rubbers only when compounding techniques and new additives have been developed that succeed in imparting proper building tack and adhesiveness to them.

It is important in the manufacture of today's tires and other textile reinforced shaped articles from EPDM rubbers that one have adhesives that will successfully adhere EPDM rubber to nylon and rayon textiles.

The art has discovered several not completely satisfactory solutions to the problem of adhesion of EPDM polymers to rayon and nylon textile cords. British Pat. No. 1,128,824 shows bonding of nylon or rayon tire cords to ethylene/propylene/diene termonomer rubber by coating with an aqueous dispersion of (A), an alpha-olefin/non-conjugated diene copolymer having epoxy groups (at least 0.3 g. mole per kg) and C=C double bonds (at least 0.3 g. mole per kg), and (B), a thermosetting phenol-aldehyde resin. Component (A) is preferably a copolymer of ethylene with dicyclopentadiene which has been peroxidized to introduce epoxy groups. Component (B) is preferably a resorcinol-formaldehyde resin. The peroxidation of copolymer in component (A) requires treatment thereof with peracetic acid or other strong oxidizing agent. Extra steps and caution in handling materials is necessary.

U.S. Pat. No. 3,338,769 describes enhancement of adhesion between EPDM polymers and nylon, rayon and polyester textiles by treating the textile with an aqueous dispersion containing:

a. a polymethylol phenol resin such as resorcinolformaldehyde b. an acrylamide-grafted, unsaturated, amorphous ternary polymer of ethylene, another 1-olefin (propylene) and an unconjugated polyene.

A key ingredient of the adhesive combination employed in the process of the patent is a three component EPDM which is first grafted with reactive acrylamide groups. It is known that merely combining EPDM polymer cord resorcinolformaldehyde resin does not provide sufficient adhesion between EPDM stock and textile reinforcing cords. The acrylamide grafting again requires the use of extra steps in processing and extra materials and undesirably adds to overall process control and costs.

It has now been discovered that a copolymer of dicyclopentadiene and one or more alpha-olefins having 2 – 12 carbon atoms, in combination with a resorcinol-formaldehyde resin, dissolved in a water emulsion, serves as an excellent adhesive for bonding nylon or rayon tire and to cured EPDM carcass stock. The copolymer can be a two component material and requires no special processing or treatment such as oxidation or grafting thereto of reactive groups.

Copolymers of dicyclopentadiene and alpha-olefins having 2 – 12 carbon atoms may be prepared using coordination catalysts of vanadium tetrachloride or vanadium oxytrichloride with a reducing compound of the structure $(R)_3Al$ or $(R)_2AlX$ where R is an alkyl radical of 1 – 12 carbon atoms and X is chlorine or bromine. A preferred reducing agent is triisobutyl aluminum with a molar ratio of aluminum to vanadium of 1:1 to 10:1. Alpha-olefins that may be employed singly, or in combination with dicyclopentadiene in the adhesives of this invention include ethylene, propylene, 1-butene, 1-octene and 1-dodecene. Typical reactions of this nature are described in U.S. Pat. No. 3,000,866.

The preferred range of materials in the dicyclopentadiene polymers employed in this invention is 1.0 mol dicyclopentadiene to 5 to 20 mols poly alpha-olefin component. Iodine numbers, obtained by an iodine monochloride titration, are related to the double bond unsaturation in the copolymer chain and run from about 25 to about 100. Iodine numbers above 40 are preferred. The preferred high level of unsaturation in the copolymer is believed to contribute to the success of the adhesive combination in bonding to textile and to EPDM.

Resorcinol-formaldehyde resins are widely employed in the tire compounding art. These are available on the market.

At present, resorcinol-formaldehyde resins are dispersed in water emulsion, or latex, and combined with vinyl pyridine latex to form RFL adhesive dips for tire cord. Their use and handling are well known.

The copolymer of dicyclopentadiene-poly alpha-olefin is prepared, dissolved in a hydrocarbon solvent (benzene is highly satisfactory) and emulsified in water in a homogenizer. An alkyl aryl sulfonate is an excellent emulsifier. The hydrocarbon solvent is then stripped off, leaving a latex emulsion. This latex is combined with resorcinol-formaldehyde resin to form a resorcinol-formaldehyde-latex (RFL) dip such as is well known in the tire art. Ratios of copolymer solids to resorcinol-formaldehyde solids may vary from as low as 2 to 1 to as high as 8 to 1. When this ratio is outside this range, adhesion to tire cord produced by the experimental cement falls off to levels that can be achieved with presently known adhesive dips. Tire cords are coated with this RFL dip and cured or baked one minute at 410°F. The dipped cords are vulcanized into an EPDM carcass compound following the procedure of ASTM test 2138–62T. The cured samples are evaluated in this test which is known as the H adhesive test for cord pull out, the result being reported in pounds.

Polymer unsaturations are evaluated by the iodine monochloride titration method which reports polymer unsaturation in terms of iodine number, said iodine number in this instance is based on the number of double bonds per 100 grams of copolymer.

SUMMARY OF THE INVENTION

This invention relates to adhesive cements for use with elastomeric materials based on ethylene-propylene-diene terpolymers and a method of preparation of said cements. It more particularly relates to improved adhesive cements for EPDM terpolymers prepared by polymerizing dicyclopentadiene with one or more alpha-olefins containing from 2 – 12 carbon atoms and combining the polymerization product with a phenol-aldehyde resin.

DETAILED DESCRIPTION

The invention is illustrated by the following Example. Parts are given in parts by weight.

EXAMPLE

An ethylene-dicyclopentadiene polymer is prepared by polymerizing 2.84 mols ethylene and 2.21 mols dicyclopentadiene with 1.5 millimols vanadium oxytrichloride and 74.3 millimols diethyl aluminum chloride reducing agent. The copolymer is separated by the addition of ethanol, washed and dried. Analysis shows the copolymer contains 15 mols ethylene and 1 mol dicyclopentadiene. The iodine number is 46.3.

The copolymer is dissolved in benzene forming a 7 percent total solids cement. A homogenized mixture of 714 g. of this cement and 3.5 g. alkyl aryl sulfonate and 750 g. water is prepared. The solvent is stripped away in a Rinco evaporator leaving a copolymer latex. On a solids basis, 14.6 g. of copolymer is combined with a resorcinol (60 percent)-formaldehyde (40 percent) resin by combining 75.0 grams copolymer latex (17.5 total solids) with two solutions A and B, containing:

| A. | Resorcinol-formaldehyde resin (75% solids) | 6.6 g. |
| | 28% ammonium hydroxide | 7.5 g. |
| | Water | 15.0 g. |
| | | 29.1 g. |
| B. | 37% Formaldehyde | 3.7 g. |
| | Water | 6.3 g. |
| | | 10.0 g. |

Tire cords of 2200/3 (2200 denier, 3 ply) rayon and 1680/2 (1680 denier, 2 ply) nylon are treated by dipping them into adhesive dip solutions. Generally between 5 percent and 10 percent of the solids available in the adhesive are deposited on the surface of the cord. The adhesive is dried on the cord at 410°F for 1 minute.

Treated cords and EPDM carcass stock, polymer 65 mol percent ethylene, 1.5 mol percent diene, DSV 2.3, are placed in a standard H mold, cured 45 minutes at 325°F and tested for H–adhesion according to ASTM 2138–62T. An RFL (vinyl pyridine) latex, standard in the current art, is used as a control.

TEST RESULTS

| | Test Latex lbs | RFL(vinyl pyridine latex) lbs |
|---|---|---|
| Rayon 2200 denier, 3 ply | 35 | 12 |
| Nylon 1680 denier, 2 ply | 25 | 15 |

I claim:

1. An adhesive composition for bonding EPDM rubber to tire cord selected from the class consisting of rayon cord and nylon cord, consisting of a latex of a copolymer with an emulsifier, said copolymer consisting of 1 mol residue derived from dicyclopentadiene to 5–20 mol residues of one or more alpha-olefins, said alpha-olefin being selected from the class consisting of alpha-olefins having 2–12 carbon atoms, said polymer being prepared in a solvent system with the use of coordination catalysis, in combination with an uncured 75 percent total solids resorcinol-formaldehyde resin of 60:40 per cent ratio by weight and for each 6.6 grams of 75 percent resin 7.5 g. of 28 percent ammonium hydroxide and 3.7 g. of formaldehyde in a water system wherein the ratio of polymer to said resorcinol-formaldehyde resin ranges from 2:1 to 8:1 and said copolymer is characterized by an iodine number between 25 and 100.

2. An adhesive composition for bonding EPDM rubber to tire cord selected from the class consisting of rayon cord and nylon cord consisting of a latex of a copolymer with an emulsifier, said copolymer consisting of 1 mol residue derived from dicyclopentadiene and 5–20 moles residue derived from ethylene, said copolymer being prepared in a solvent system with the use of coordination catalysis, in combination with an uncured 75 percent total solids resorcinol-formaldehyde resin of 60:40 percent ratio by weight and for each 6.6 grams of 75 percent resin 7.5 g. of 28 percent ammonium hydroxide and 3.7 g. of formaldehyde in a water system wherein the ratio of polymer to said resorcinol-formaldehyde resin ranges from 2:1 to 8:1, said copolymer being characterized by an iodine number of between 25 and 100.

* * * * *